Feb. 27, 1968  MASATARO MUTO ETAL  3,370,563
METHOD OF BUILDING A FLOATING STRUCTURE OF LARGE
SIZE SUCH AS A HULL AND THE LIKE
Filed Jan. 11, 1967                               2 Sheets-Sheet 1

INVENTORS
MASATARO MUTO and
YASUTOSHI SANO
BY McGlew and Toren
ATTORNEYS

United States Patent Office 3,370,563
Patented Feb. 27, 1968

3,370,563
METHOD OF BUILDING A FLOATING STRUCTURE OF LARGE SIZE SUCH AS A HULL AND THE LIKE
Masataro Muto, Tokyo, and Yasutoshi Sano, Yokohama-shi, Japan, assignors to Mitsubishi Jukogyo Kabushiki Kaisha, Tokyo, Japan
Filed Jan. 11, 1967, Ser. No. 608,577
Claims priority, application Japan, July 4, 1966, 41/43,401
6 Claims. (Cl. 114—77)

ABSTRACT OF THE DISCLOSURE

A method of building a floating structure such as a ship hull is described in respect to various illustrated method steps and method variations. The floating structure is built by first constructing a first part, for example a stern part or stern body as a dry building berth or dry dock and either simultaneously with its building or directly thereafter constructing an intermediate hull portion or joining member to the section which is being built directly on the dock. The intermediate member is advantageously temporarily secured to the first part such as by fixing jigs which are removed after completion of the first part and the forming member in order to permit the separate launching of the finished first part.

Thereafter another section or second part, for example a bow section, is jointed to the intermediate joining member which remains on the dock advantageously at the sea or water end thereof to permit building of the second part directly to the intermediate joining member. The second part with the joining member are launched into the water from the berth and the assembly is joined to the first part in the water.

A modification of the method is to launch the joining member with the first part so that it is moved off the building dock. Thereafter the joining member is removed from the first part and towed back to the dry dock and positioned so that the second part may be built directly onto the joining member.

In accordance with still another method the joining member which has been secured to the first part may be removed from the first part to permit separate launching thereof and then the joining member is reversed in position so that the second part may be jointed thereto proceeding in the direction from the inner end of the dock outwardly toward the water or the sea.

In a still further modification the joining member is hingedly connected to the section of the vessel which has first been constructed so that it may be easily removed after the member is floated in the water or even prior thereto after it has been completed.

SUMMARY OF THE INVENTION

The present invention relates to a method of building a floating structure of a large size such as a ship hull and the like and more particularly to a method by which a large-size floating structure is built easily by the use of the existing building installation and an intermediate hull connecting section.

The principal object of the invention is to join separately built structure sections of a floating structure such as a hull and the like to one another as one body in the building dock or in a floating condition on the water or sea in a simple manner and in safety.

Another object of the invention is to improve an accuracy of working and to save time for conformation of sections of a floating structure such as a hull and the like which are built separately in the building berth or dock by joining those sections to one another respectively through interposition of a joining member as an intermediate member which was previously built in abutment against the joining portion of each section.

Other objects and advantages of the invention will be apparent from the following description of several embodiments thereof illustrated in the accompanying drawings, in which:

FIG. 1 shows schematically an afterbody of a hull construction;

FIG. 2 shows the afterbody of the hull in a launching condition;

FIG. 3 shows a forebody of the hull under construction;

FIG. 4 shows the fore and the afterbody joined to each other;

Figure 1:
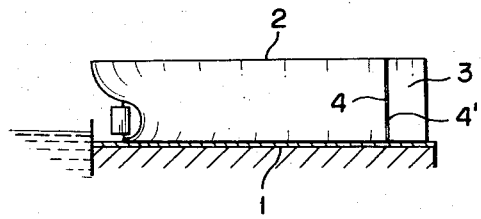
FIGS. 1 to 4 illustrate a first embodiment of the invention.
Figure 2:
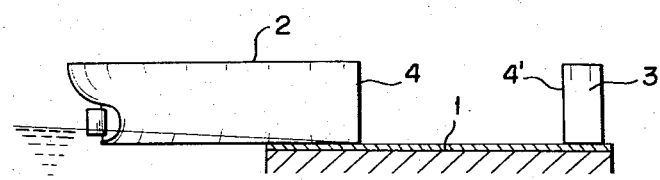
Figure 3:
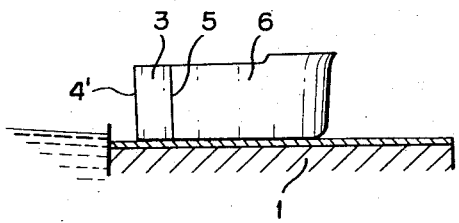

Referring now to FIGS. 1 to 4, 1 denotes a building berth, 2 an afterbody of a hull, and 3 a joining member for use in joining the afterbody 2 and a forebody 6 of a hull to each other. To begin with, the afterbody 2 is built on the building berth 1. Further the ring-shaped joining member 3 which corresponds to the rear end of the forebody 6 is built directly adjacent the forebody 6 on the building berth 1 and to joining portions 4, 4' thereof are secured to the afterbody 2 of joining jigs is. Then the afterbody 2 is launched, as shown in FIG. 2, while the joining member 3 is then moved outwardly to the end of the sea end of the building berth 1 and serves as an end member of the forebody 6 which is built inwardly therefrom as shown in FIG. 3.

To the fore-end 5 of the joining member 3 which is fixed at a predetermined position after movement are welded a number of prefabricated blocks one after another to form the forebody 6. The forebody 6 is thus completed integrally with the joining member 3.

Figure 4:
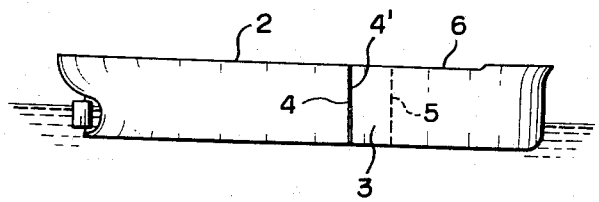

The completed forebody 6 after launching is joined to the afterbody 2 which has previously been launched through interposition of the joining member 3 either in the building dock or in a floating condition on the water, as shown in FIG. 4.

Upon welding side platings of the joining portions to each other below the water line, those portions are covered with a waterproof band whose cross section is nearly semicircular and which is made of an elastic material such as rubber or the like and reinforced with wire frames of sufficient strength to stand water pressure. Then water in the space covered with the waterproof band is discharged and welding of the side platings is carried out in the dry space.

While execution of joining the bodies on the sea has been described in the above embodiment, it may be carried out in a dock. In this case one of both bodies to be joined, as a basis in joining, is at first placed on blocks, and the relative position of the other to the one is adjusted by discharging water in the dock instead of pouring ballast into one of the bodies. After adjustment of the deck levels of both bodies, they are fixed and welded to each other at their joining portions in a dry condition.

A new hull which has been built by joining as described above, upon final docking prior to official trial, is inspected at the inside welded portion below the water, repaired, if necessary, and finally riveted at the rivet joint portion.

Figure 5:
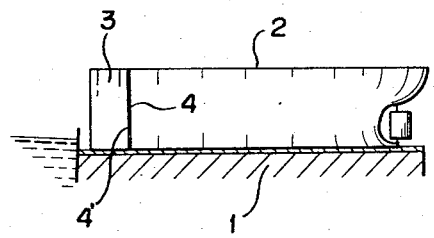
FIGS. 5 and 6 illustrate a second embodiment of the invention corresponding to FIGS. 1 and 3 with the exception that the afterbody is built in the reversed position.

FIG. 5 illustrates a second embodiment wherein the afterbody 2 is built on the building berth 1 with the joining portions 4, 4' connected to the afterbody 2 while the joining member 3 is situated at the sea side. In this case the joining member 3 at the rear end of the afterbody is built simultaneously with the afterbody in such manner that the joining portions 4 and 4' of the afterbody 2 and the joining member 3 are conformed to each other in cross section as described above, and then launched to float together with the afterbody 2.

Figure 6:
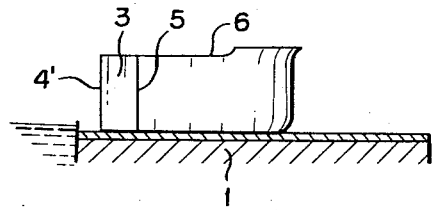

The joining member 3 is then separated from the afterbody 2 on the sea, turned to the reverse direction there and pulled again into the building berth 1 to be fixed. The forebody 6 is built in conformation to the joining member 3 as shown in FIG. 6. The thus built afterbody 2 and the forebody 6 are joined to each other in the manner described in the first embodiment. In this embodiment it is unnecessary to move the joining member 3 as an end member for building the forebody 6 on the building berth 1 from the end at the shore side of the building berth to the end at the sea side, and this eliminates a troublesome work of moving the joining member on the building berth. Further it is advantageous for the progress of work that the stern portion of a next hull, which requires a larger amount of work for building, may be built at the shore side end of the same building berth simultaneously with construction of the forebody 6.

Figure 7:
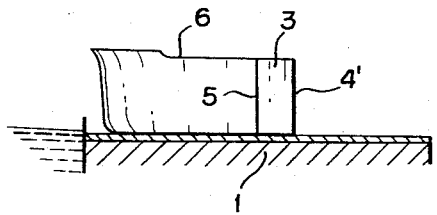
FIG. 7 illustrates a third embodiment of the invention wherein the forebody is built together with a joint member at its rear end and which was turned by 180° after construction of the afterbody.

FIG. 7 illustrates a third embodiment wherein the joining member 3, after launch of the afterbody 2 as shown in FIG. 2, is turned by 180° on the building berth 1, in conformation to which the forebody is built. In this case the forebody 6 is built with the joining portion directed to the shore. This method makes it unnecessary not only to move the joining member 3 from the shore side end to the sea side end on the building berth 1 for use as an end member in building the forebody 6 as in the first embodiment, but it is also unnecessary to pull the reversed joining member 3 into the building berth after launching together with the afterbody 2 as in the second embodiment. Since the forebody 6 upon building is suitated with the joining portion 5 directed to the shore, increase in buoyancy of the body upon launching is slower than that in the first and the second embodiment so that the position of lift by stern lines at the sea side result in reduction of pivoting load. In addition this embodiment has another advantage of unnecessary ballast adjustment. Joining of both bodies is carried out in the same way as described in connection with the first embodiment.

Figure 8:
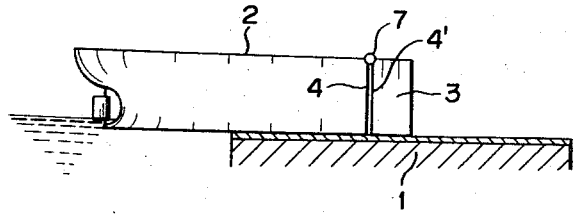
FIG. 8 illustrates a fourth embodiment of the invention wherein the afterbody with a joining member hinged thereto is in a launching condition.

FIG. 8 illustrates a fourth embodiment wherein the joining member 3 is coupled with the afterbody 2, when it is situated as in FIG. 1, by means of a hinge member 7 arranged at the end of upper deck and launched together with the afterbody.

In this case the joining member 3 is separated from the afterbody 2 on the sea and thereafter pulled into the building berth or the dock. The forebody 6, after being built in conformation to the joining member 3, is joined to the afterbody 2 in the same way as described in FIGS. 3 and 4.

In the above fourth embodiment as in the second embodiment, it is unnecessary to move the joining member 3 to the sea side end of the berth. Further it is of advantage for the progress of work that the stern portion of a next new hull, which requires a larger amount of work for building, may be constructed at the shore side end of the same berth simultaneously with construction of the forebody 6. Since the joining member 3 is coupled with the afterbody 2 only by means of the hinge member 7, its uncoupling is easy.

As described above, the invention obviates disadvantages of the prior direct connection of hull sections, and makes it possible to improve accuracy of working and to save time for conformation of hull sections to be joined by joining those sections through interposition of a joining member as an intermediate member which is previously built in abutment against a hull portion.

While the invention has been illustrated and described in connection with preferred embodiments, it is apparent that various modifications may be made without departing from the spirit of the invention.

What is claimed is:
1. A method of building a floating structure such as a ship hull using a dry dock adjacent the water, comprising constructing a first part of the floating structure on a dry dock, constructing an intermediate joining member forming a separate part directly adjacent said first part at the end thereof which is to be joined to a second part, launching said first part into the water, thereafter building a second part to the joining member on the dry dock, launching the second part with the joining member into the water, and orienting the joining member adjacent the first part and connecting the first part to the second part by joining the joining member to said first part.

2. A method of building a floating structure such as a ship hull using a dry dock having an end directed toward water, comprising constructing a first section of the floating structure on a dry dock, constructing an intermediate joining member forming a separate section directly to the first section at the end thereof which is to be joined to a second section to be built, removing the joining member from the ship section which has been constructed and launching the section which has been constructed into the water, moving the joining member along the dry dock to the end thereof adjacent the water thereafter building said second section to the joining member, launching said second section with said joining member into the water, and orienting said joining member adjacent said first ship section and connecting said first section to said second section by joining the joining member to said first section.

3. A method of building a floating structure such as a ship hull using a dry dock having an end adjacent the water, comprising constructing a first section of the floating structure on the dry dock, constructing an intermediate joining member, launching the second section with the directly to said first section and the end thereof which is to be joined to another section, launching the section which has been constructed and the joining member into the water, directing said joining member back to said dry dock, thereafter building a second section to said joining member, launching the second section with the joining member into the water and orienting the joining member adjacent the first section and connecting the first section to the second section by joining the joining member to said first section.

4. A method according to claim 1, wherein said joining member is removed from said first section prior to the launching thereof and where it is rotated 180° on said drydock, said second section being built inwardly from said joining member.

5. A method according to claim 1, wherein said joining member is hingedly connected to said first section to permit easy removal therefrom.

6. A method according to claim 1, wherein said first section is a stern section, said second section comprising a bow section.

References Cited
UNITED STATES PATENTS

| 2,732,818 | 1/1956 | Quirin | 114—77 X |
| 3,320,919 | 5/1967 | Deal | 114—77 |

FERGUS S. MIDDLETON, *Primary Examiner.*

T. M. BLIX, *Assistant Examiner.*